United States Patent
Cheng et al.

(10) Patent No.: US 12,091,315 B2
(45) Date of Patent: Sep. 17, 2024

(54) METHOD OF PREPARING SULFURYL FLUORIDE

(71) Applicants: CONTEMPORARY AMPEREX TECHNOLOGY CO., LIMITED, Fujian (CN); CATL-SICONG NOVEL MATERIALS CO., LTD, Longyan (CN)

(72) Inventors: Sicong Cheng, Longyan (CN); Qisen Huang, Fujian (CN)

(73) Assignees: CONTEMPORARY AMPEREX TECHNOLOGY CO., LIMITED, Ningde (CN); CATL-SICONG NOVEL MATERIALS CO., LTD, Longyan (CN)

( * ) Notice: Subject to any disclaimer, the term of this patent is extended or adjusted under 35 U.S.C. 154(b) by 0 days.

(21) Appl. No.: 18/343,771

(22) Filed: Jun. 29, 2023

(65) Prior Publication Data
US 2023/0348272 A1 Nov. 2, 2023

Related U.S. Application Data

(63) Continuation of application No. PCT/CN2022/074935, filed on Jan. 29, 2022.

(51) Int. Cl.
C01B 17/45 (2006.01)

(52) U.S. Cl.
CPC ................ *C01B 17/4576* (2013.01)

(58) Field of Classification Search
CPC .................................... C01B 17/4576
USPC ........................................ 423/468
See application file for complete search history.

(56) References Cited

U.S. PATENT DOCUMENTS

| | | | |
|---|---|---|---|
| 3,132,925 A | 5/1964 | Pacini et al. | |
| 3,146,068 A | 8/1964 | Soulen | |
| 3,320,030 A | 5/1967 | Bisignani et al. | |
| 3,403,144 A * | 9/1968 | Kei | C01B 17/4576 |
| | | | 423/468 |
| 4,039,646 A | 8/1977 | Massonne et al. | |
| 6,143,269 A | 11/2000 | Schulz et al. | |
| 6,238,642 B1 | 5/2001 | Schulz et al. | |
| 2001/0014308 A1 | 8/2001 | Schulz et al. | |
| 2006/0062719 A1 | 3/2006 | Mathieu et al. | |

FOREIGN PATENT DOCUMENTS

| | | | | |
|---|---|---|---|---|
| CN | 1243803 A | 2/2000 | | |
| CN | 1259515 A | 7/2000 | | |
| CN | 1308014 A | 8/2001 | | |
| CN | 1678520 A | 10/2005 | | |
| CN | 101644670 A | 2/2010 | | |
| CN | 102351681 A | 2/2012 | | |
| CN | 103864022 A | 6/2014 | | |
| CN | 106946231 A * | 7/2017 | | |
| CN | 111470479 A | 7/2020 | | |
| DE | 2714179 A1 | 10/1978 | | |
| DE | 19834882 A1 * | 2/2000 | ......... | C01B 17/4576 |
| DE | 10111302 A1 * | 9/2002 | ............ | B01J 20/046 |
| EP | 1240937 A1 | 9/2002 | | |
| EP | 3782972 A1 | 2/2021 | | |
| GB | 1063354 A * | 3/1967 | | |
| JP | 2013-170129 A | 9/2013 | | |

OTHER PUBLICATIONS

Haszeldine, R. N., and R. J. Marklow. "202. Polyfluoroalkyl compounds of silicon. Part I. Reaction of trichlorosilane with tetrafluoroethylene." Journal of the Chemical Society (Resumed) (1956): 962-970. (Year: 1956).*
English translation of CN-106946231-A Description (Year: 2017).*
English translation of DE-10111302-A1 Description (Year: 2002).*
English translation of DE-19834882-A1 Description (Year: 2000).*
Office Action issued Jul. 25, 2023 in Chinese Patent Application No. 202211259170.2, 20 pages.
Junru Wang, "Natural product extraction, separation and identification technology", Northwest A&F University Press Co., Ltd, May 31, 2006. 4 pages.
International Search Report and Written Opinion mailed on Oct. 21, 2022, received for PCT Application PCT/CN2022/074935, filed on Jan. 29, 2022, 13 pages including English Translation.
Luo et al., "Preparation and application progress of sulfuryl fluoride", The 718 Research Institute of CSIC, Nov. 2014, pp. 28-31 (6 pages including English Abstract).
Notice of Allowance mailed on Sep. 20, 2022, received for CN Application 202210111605.2, 9 pages including English Translation.

* cited by examiner

*Primary Examiner* — Anthony J Zimmer
*Assistant Examiner* — Eric Scott Sherman
(74) *Attorney, Agent, or Firm* — XSENSUS LLP

(57) ABSTRACT

The present application provides a method of preparing sulfuryl fluoride, including the following steps of: S1) reacting sulfur trioxide steam with barium fluoride to acquire a mixed gas of barium sulphate and sulfuryl fluoride; S2) pickling the mixed gas acquired in step S1 with a concentrated sulfuric acid solution with a concentration of 70-98.3 wt. % to acquire a primary purified sulfuryl fluoride gas; S3) passing the primary purified sulfuryl fluoride gas acquired in step S2 through an aqueous solution with a concentration of 2-10 wt. % selected from at least one of the following: sodium sulfite, sodium bisulfite, sodium pyrosulfite, and sodium thiosulfate, to acquire a sulfuryl fluoride gas.

20 Claims, No Drawings

ND OF PREPARING SULFURYL
FLUORIDE

METHOD OF PREPARING SULFURYL FLUORIDE

CROSS-REFERENCE TO RELATED APPLICATION

The present application is a continuation of International Application No. PCT/CN2022/074935, filed Jan. 29, 2022, which is incorporated herein by reference in its entirety.

TECHNICAL FIELD

The present application relates to a method of preparing sulfuryl fluoride, and in particular to a method of preparing sulfuryl fluoride having high purity.

BACKGROUND

Sulfuryl fluoride is an inorganic compound with a chemical formula of $SO_2F_2$. At normal temperature and pressure, it is a colorless and odorless toxic gas. It is chemically inert, which does not decompose at the high temperature and is still stable at 400° C. and not very reactive. The sulfuryl fluoride has become a widely used fumigant due to advantages of strong diffusion and permeability, convenient use at the low temperature, fast desorption, low dosage, no corrosion and no color effect on metals, cotton fabrics, leather, and plastics. In addition, with further study on the sulfuryl fluoride, it is gradually used in more and more fields as an important intermediate in the fluorine chemical industry.

In recent years, the sulfuryl fluoride has been used as a raw material to synthesize lithium difluorosulfonylimide. The lithium difluorosulfonylimide (with chemical formula of $Li[N(SO_2F)_2]$, and English abbreviation of LiFSI) is an important new fluoride containing material, a new lithium salt electrolyte material with a broad application prospect for lithium ion batteries, and a key high performance electrolyte material in the lithium ion batteries, supercapacitors and ionic liquids, having a high industrial application value. After adding the lithium difluorosulfonylimide into a lithium ion battery electrolytic solution, a battery system has advantages of high electrochemical stability, low probability of side reaction, high thermal stability, and proper conductivity, especially in power batteries, which can improve cycle performance and rate performance of the power batteries. However, as the raw material to synthesize the lithium difluorosulfonylimide, it is required that the sulfuryl fluoride has the high purity.

At present, the reported methods of preparing the sulfuryl fluoride adopting sulfur trioxide as the raw material are as follows: U.S. Pat. No. 3,403,144 reported a method of preparing sulfuryl fluoride by reacting barium fluoride or barium fluosilicate with sulfur trioxide at the reaction temperature of 500-650° C., but did not relate to certification and separation of by-products; CN102351681A reported a method of continuously synthesizing trifluoroacetyl chloride and sulfuryl fluoride; that is, sulfur trioxide and trifluorotrichloroethane are continuously passed into middle and lower parts of a reactive rectification tower with catalyst and packing, the temperature of tower kettle is controlled at 120-130° C., a reflux ratio is 2.5-3, the trifluoroacetyl chloride is collected from tower top, and after the sulfuryl chloride and pyrosulfuryl chloride in tower kettle are fractionated, sulfuryl chloride and hydrogen fluoride are then fluorinated to produce sulfuryl fluoride under the action of palladium/carbon catalyst; such method is relatively complex and not relates to the separation of by-products, nor does it report purity of sulfuryl fluoride acquired. Therefore, the composition of sulfuryl fluoride products acquired by the existing method of preparing the sulfuryl fluoride with the sulfur trioxide as the raw material is complex, the reaction yield is not high, and the purity of sulfuryl fluoride needs to be further improved.

It is an urgent problem for those skilled in the art to provide a preparation method to make the sulfuryl fluoride low in production cost, high in purity, high in yield and suitable for industrial production.

SUMMARY

In view of the problems existing in the prior art, the present application provides a method of preparing sulfuryl fluoride, including the following steps of:
S1) reacting sulfur trioxide steam with barium fluoride to acquire a mixed gas of barium sulphate and sulfuryl fluoride;
S2) pickling the mixed gas acquired in step S1 with a concentrated sulfuric acid solution with a concentration of 70-98.3 wt. % to acquire a primary purified sulfuryl fluoride gas;
S3) passing the primary purified sulfuryl fluoride gas acquired in step S2 through an aqueous solution with a concentration of 2-10 wt. % selected from at least one of the following: sodium sulfite, sodium bisulfite, sodium pyrosulfite, and sodium thiosulfate, to acquire a sulfuryl fluoride gas.

In any embodiments, the method further includes step S4 of cooling the sulfuryl fluoride gas acquired in step S3 with liquid nitrogen and then passing the sulfuryl fluoride gas into a rectification system for rectification and separation, the rectification temperature is −70 to −50° C., preferably −65 to −55° C., and a reflux ratio is 0.5-1, preferably 0.6-0.8.

In any embodiments, potassium iodide or sodium iodide with a concentration of 0.1-2 wt. % is added to the solution in step S3.

In any embodiments, in step S3, the primary purified sulfuryl fluoride gas acquired in step S2 is passed through a sodium sulfite aqueous solution of 2-10 wt. %.

In any embodiments, potassium iodide of 0.1-2 wt. % is added to the sodium sulfite aqueous solution of 2-10 wt. % in step S3.

In any embodiments, in step S3, a primary purified sulfuryl fluoride gas bubble passes through an aqueous solution with the temperature of 20-40° C. selected from at least one of sodium sulfite, sodium bisulfite, sodium pyrosulfite and sodium thiosulfate.

In any embodiments, in the sulfuryl fluoride gas acquired in step S3, a volume fraction of oxygen difluoride is less than 0.1%.

In any embodiments, in the sulfuryl fluoride gas acquired in step S3, a volume fraction of sulfoxide tetrafluoride is less than 0.15%.

In any embodiments, the barium fluoride in step S1 is prepared by treating a barium sulfide aqueous solution with hydrogen fluoride, or by reacting barium chloride with sodium fluoride.

In any embodiments, in step S1, sulfur trioxide steam is directly used or the sulfur trioxide steam transported through helium as a carrier is used to react with the barium fluoride.

In the present application, the method of preparing the sulfuryl fluoride has the following advantages: raw materials used are cheap and easily available, production process is simple, and cost is low, such that the prepared sulfuryl fluoride has high yield and high purity and is suitable for industrial production.

DESCRIPTION OF EMBODIMENTS

Embodiments of a method of preparing sulfuryl fluoride in the present application are described in detail below. However, unnecessarily detailed descriptions may be omitted in some cases. For example, detailed description for a well-known matter or repeated description for a practically identical structure may be omitted. This is done to avoid unnecessarily redundant descriptions for ease of understanding by those skilled in the art. In addition, the drawings and the following description are provided for those skilled in the art to fully appreciate the present application, and are not intended to define the subject matters described in the claims.

A "range" disclosed herein is defined in the form of a lower limit and an upper limit. A given range is defined by selecting a lower limit and an upper limit, and the selected lower limit and upper limit define a boundary of a particular range. The range defined in this manner may or may not include end values, and may be combined arbitrarily, that is, any lower limit may be combined with any upper limit to form a range. For example, if ranges of 60-120 and 80-110 are listed for a particular parameter, it is understood that ranges of 60-110 and 80-120 are also contemplated. In addition, if the minimum range values listed are 1 and 2, and the maximum range values listed are 3, 4 and 5, all the following ranges are contemplated: 1-3, 1-4, 1-5, 2-3, 2-4, and 2-5. In the present application, unless otherwise specified, a numerical range "a-b" represents an abbreviated representation of any combination of real numbers between a and b, where both a and b are real numbers. For example, a numerical range "0-5" means that all real numbers between "0-5" have been listed herein, and "0-5" is just an abbreviated representation of combination of these numerical values. In addition, when a certain parameter is expressed as an integer ≥2, it is equivalent to disclosing that the parameter is, for example, an integer of 2, 3, 4, 5, 6, 7, 8, 9, 10, 11, 12, or the like.

Unless otherwise specified, all embodiments and optional embodiments of the present application may be combined with each other to form a new technical solution.

Unless otherwise specified, all technical features and optional technical features of the present application may be combined with each other to form a new technical solution.

Unless otherwise specified, "comprising" and "containing" mentioned in the present application are open-ended or closed-ended. For example, the "comprising" and "containing" may mean that other components that are not listed may further be comprised or contained, or only listed components may be comprised or contained.

In the present application, unless otherwise specified, the term "or" is inclusive. For example, the phrase "A or B" means "A, B or both A and B". More particularly, a condition "A or B" is satisfied by any one of the following: A is true (or present) and B is false (or not present); A is false (or not present) and B is true (or present); or both A and B are true (or present).

The present application provides a method of preparing sulfuryl fluoride, including the following steps of:

S1) reacting sulfur trioxide steam with barium fluoride to acquire a mixed gas of barium sulphate and sulfuryl fluoride;

S2) pickling the mixed gas acquired in step S1 with a concentrated sulfuric acid solution with a concentration of 70-98.3 wt. % to acquire a primary purified sulfuryl fluoride gas;

S3) passing the primary purified sulfuryl fluoride gas acquired in step S2 through an aqueous solution with a concentration of 2-10 wt. % selected from at least one of the following: sodium sulfite, sodium bisulfite, sodium pyrosulfite, and sodium thiosulfate, to acquire a sulfuryl fluoride gas.

In the method of the present application, the temperature is room temperature and the pressure is atmospheric pressure during the operation.

In the method of the present application, the amount of sulfuryl fluoride, sulfur trioxide and by-products in the mixed gas are acquired by gas chromatography. In the present application, the purity of sulfuryl fluoride gas is a percentage of a volume of sulfuryl fluoride gas to a volume of mixed gas in the sulfuryl fluoride mixed gas.

In the present application, the barium fluoride used in the step S1 can be acquired by the method of preparing the barium fluoride known in the prior art. In some embodiments, the barium fluoride is acquired by treating a barium sulfide aqueous solution with hydrogen fluoride. In other embodiments, the barium fluoride is acquired by reacting barium chloride with sodium fluoride.

In some embodiments, in step S1, sulfur trioxide steam is directly used to react with the barium fluoride to acquire the sulfuryl fluoride. In other embodiments, step S1, the sulfur trioxide steam transported by helium as a carrier is used to react with the barium fluoride to acquire the sulfuryl fluoride, where sulfur trioxide steam is prepared by means of heating 65% fuming sulfuric acid and phosphorus pentoxide ($3H_2SO_4+P_2O_5 \rightarrow 2H_3PO_4+3SO_3$, the phosphoric acid produced is non-volatile acid). There are excessive sulfur trioxide, as well as by-products oxygen difluoride ($OF_2$), sulfoxide tetrafluoride ($F_4OS$), and sulfur hexafluoride ($SF_6$) in the sulfuryl fluoride gas acquired in step S1.

In some embodiments, in step S1, a molar ratio of the sulfur trioxide steam to the barium fluoride is 2:1-5:1, preferably 2.5:1-3:1, and the reaction temperature is 500-600° C., preferably 550-600° C. In some preferred embodiments, a bubbler structure is added at the sulfur trioxide feed, such as a porous material made of polytetrafluoroethylene fiber, such that the sulfur trioxide enters a reactor in a fine foam state, and the contact time and contact area with the barium sulfide are increased for better reaction.

In some embodiments, in step S2, the mixed gas acquired in step S1 is pickled with a concentrated sulfuric acid solution with a concentration of 70-98.3%. In some preferred embodiments, the sulfuryl fluoride mixed gas acquired in step S1 is pickled with a concentrated sulfuric acid solution with a concentration of 80-95%, so as to better remove the sulfur trioxide in the sulfuryl fluoride mixed gas, thereby acquiring a primary purified sulfuryl fluoride gas with the sulfuryl fluoride purity of about 94%.

In some embodiments, in step S3, the primary purified sulfuryl fluoride gas acquired in the step S2 passes through an aqueous solution with a concentration of 2-10 wt. % selected from at least one of the following: sodium sulfite, sodium bisulfite, sodium pyrosulfite, and sodium thiosulfate, to remove reaction by-products oxygen difluoride ($OF_2$) and sulfoxide tetrafluoride ($F_4OS$). In some embodiments, the primary purified sulfuryl fluoride gas acquired in step S2 passes through the above solution with a temperature of 20-40° C. by means of bubbling. Therefore, in the sulfuryl fluoride gas acquired in step S3, a volume fraction of oxygen difluoride is less than 0.1%, a volume fraction of sulfoxide tetrafluoride is less than 0.15%, and the volume fractions of oxygen difluoride and sulfoxide tetrafluoride are measured by gas chromatography.

In some preferred embodiments, in step S3, the primary purified sulfuryl fluoride gas acquired in step S2 passes through an aqueous solution with a concentration of 4-8 wt. %, preferably 5-6 wt. %, selected from sodium sulfite, sodium bisulfite, sodium pyrosulfite, and sodium thiosulfate. In some more preferred embodiments, the primary purified sulfuryl fluoride gas acquired in step S2 passes through a sodium sulfite aqueous solution with a concentration of 2-10 wt. %, preferably 4-8 wt. %, and more preferably 5-6 wt. %. More preferably, the primary purified sulfuryl fluoride gas acquired in step S2 passes through a sodium sulfite solution with a concentration of 5 wt. %.

In some more preferred embodiments, potassium iodide or sodium iodide with a concentration of 0.1-2 wt. % is added to the solution in step S3. Preferably, potassium iodide with a concentration of 0.1-2 wt. % is added to the solution in step S3. More preferably, potassium iodide with a concentration of 0.5 wt. % is added to the solution in step S3.

In other more preferred embodiments, potassium iodide of 0.1-2 wt. % is added to the sodium sulfite aqueous solution in step S3. Preferably, the primary purified sulfuryl fluoride gas acquired in step S2 passes through sodium sulfite of 5 wt. % and a potassium iodide solution of 0.5 wt. %.

In some preferred embodiments, the method further includes step S4; that is, the sulfuryl fluoride gas acquired in step S3 is cooled with liquid nitrogen and then passed into a rectification system for rectification and separation, the rectification temperature is −70 to −50° C., preferably −65 to −55° C., and a reflux ratio is 0.5-1, preferably 0.6-0.8, so as to separate the sulfuryl fluoride from by-product sulfur hexafluoride to acquire sulfuryl fluoride of high purity, that is, the purity of sulfuryl fluoride acquired after rectification and separation is up to 99%.

In the present application, the barium sulfate acquired in step S1 is reduced with carbon at a temperature of 600-1200° C., and the barium sulfide acquired can be used again to prepare the barium fluoride.

In the present application, the acquired sulfuryl fluoride gas is dried, compressed, and condensed to acquire a sulfuryl fluoride product.

EMBODIMENTS

Hereinafter, the embodiments of the present application are illustrated. The embodiments described below are illustrative and merely used to explain the present application, and may not be understood as the definition to the present application. If no specific technique or condition is indicated in the embodiments, it shall be carried out in accordance with the technique or condition described in the literature in the art or in accordance with the product specification. Reagents or instruments used that do not indicate manufacturers are conventional products that can be purchased in the market.

I. Raw Materials

Hydrogen fluoride (HF, CAS: 7664-39-3, purchased from Sinopharm Chemical Reagent Co., Ltd)

Barium sulfide (BaS, CAS: 21109-95-5, purchased from Sinopharm Chemical Reagent Co., Ltd)

Barium chloride ($BaCl_2$, CAS: 10361-37-2, purchased from Sinopharm Chemical Reagent Co., Ltd)

Sodium fluoride (NaF, CAS: 7681-49-4, purchased from Sinopharm Chemical Reagent Co., Ltd)

Sulfur trioxide steam ($SO_3$, prepared by heating 65% fuming sulfuric acid and phosphorus pentoxide)

65% fuming sulfuric acid (purchased from Zibo Jianlong Chemical Co., Ltd)

Concentrated sulfuric acid ($H_2SO_4$, with a concentration of 70-98.3%, purchased from Sinopharm Chemical Reagent Co., Ltd)

Sodium sulfite ($Na_2SO_3$, CAS: 7757-83-7, purchased from Sinopharm Chemical Reagent Co., Ltd)

Sodium bisulfite ($NaHSO_3$, CAS: 7631-90-5, purchased from Sinopharm Chemical Reagent Co., Ltd)

Sodium metabisulfite ($Na_2S_2O_5$, CAS: 7681-57-4, purchased from Sinopharm Chemical Reagent Co., Ltd)

Sodium thiosulfate ($Na_2S_2O_3$, CAS: 7772-98-7, purchased from Sinopharm Chemical Reagent Co., Ltd)

Potassium iodide (KI, CAS: 7681-11-0, purchased from Sinopharm Chemical Reagent Co., Ltd)

Sodium iodide (NaI, CAS: 7681-82-5, purchased from Sinopharm Chemical Reagent Co., Ltd)

Liquid nitrogen (purchased from Fujian Dehe Chemical Co., Ltd)

Carbon (C, CAS: 7440-44-0, purchased from Sinopharm Chemical Reagent Co., Ltd)

Palladium-based catalyst (purchased from Kangchi Chemical Industry Shenzhen Co., Ltd)

II. Instruments

Use the gas chromatography model 7890B of Agilent Technologies to detect gas components. During the detection, set instrument parameters as follows: column box temperature 40-260° C., detector type FID/TCD, detector temperature 300° C., air pressure 0.4 MPa, hydrogen flow 30 ml/min, and air flow 400 ml/min.

III. Preparation of Barium Fluoride (1) Preparation of Barium Fluoride from Hydrogen Fluoride and Barium Sulfide Weigh 169.4 g barium sulfide and dissolve it in 1000 ml water; place the solution in a reaction kettle of 25° C.; pass a hydrogen fluoride gas into the barium sulfide aqueous solution at 10 ml/min during the stirring; precipitate white solid barium fluoride as the reaction proceeds; and wash the acquired barium fluoride with deionized water and dry it at 70° C.

(2) Preparation of Barium Fluoride from Barium Chloride and Sodium Fluoride

Weigh 208.2 g barium chloride and dissolve it in 1000 ml water; then add 50.4 g sodium fluoride during the stirring; precipitate white solid barium fluoride as the reaction proceeds; and after being filtered, wash the acquired barium fluoride with deionized water and dry it at 70° C.

IV. Preparation of Sulfur Trioxide Steam

Heat 65% fuming sulfuric acid and phosphorus pentoxide at 60° C. with a molar ratio of 5:1 to produce sulfur trioxide steam.

V. Preparation of Barium Sulfide from Recovered Barium Sulfate

React barium sulfate and carbon at the temperature of 1000° C. under atmospheric pressure with a molar ratio of 1:2.5, using palladium-based catalyst.

Comparative Example 1

Place 175.3 g solid barium fluoride in a reactive kettle; heat the apparatus to 580° C. by an electric heater; pass sulfur trioxide steam through solid barium fluoride at 10 ml/min, where a molar ratio of barium fluoride to sulfur trioxide is 1:2.5; and dry the sulfuryl fluoride mixed gas acquired from the reaction.

Detect the acquired sulfuryl fluoride mixed gas by gas chromatography, where composition and corresponding proportion of the mixed gas are listed in Table 1.

Comparative Example 2

Place 175.3 g solid barium fluoride in a reactive kettle; heat the apparatus to 580° C. by an electric heater; pass sulfur trioxide steam through solid barium fluoride at 10 ml/min, where a molar ratio of barium fluoride to sulfur trioxide is 1:2.5, acquire a sulfuryl fluoride mixed gas from reaction; pickle the acquired mixed gas through a concentrated sulfuric acid solution with a concentration of 70% containing in a pickling tank; and dry the acquired primary purified sulfuryl fluoride gas.

Detect the primary purified sulfuryl fluoride gas after being pickled with the concentrated sulfuric acid by gas chromatography, where purity of the acquired sulfuryl fluoride is listed in Table 2.

Comparative Example 3

Except for passing a sulfuryl fluoride mixed gas through a concentrated sulfuric acid solution with s concentration of 98.3%, the others are the same as the comparative example 2, where results are listed in Table 2.

Embodiment 1

Place 175.3 g solid barium fluoride in a reactive kettle; heat then apparatus to 580° C. by an electric heater; pass sulfur trioxide steam through solid barium fluoride at 10 ml/min, where a molar ratio of barium fluoride to sulfur trioxide is 1:2.5, acquire a sulfuryl fluoride mixed gas from reaction; pickle the acquired mixed gas through a concentrated sulfuric acid solution with a concentration of 70% containing in a pickling tank to acquire a primary purified sulfuryl fluoride gas; then pass the primary purified sulfuryl fluoride gas into a sodium sulfite solution with a concentration of 2 wt. % by means of bubbling for purification; and dry the acquired water containing sulfuryl fluoride gas.

Detect the sulfuryl fluoride gas by gas chromatography, where purity of the acquired sulfuryl fluoride is listed in Table 2.

Embodiments 2-6

Except for passing a primary purified sulfuryl fluoride gas through a sodium sulfite solution with a concentration of 4 wt. %, 5 wt. %, 6 wt. %, 8 wt. %, and 10 wt. %, respectively, for purification, the others are the same as embodiment 1, where results are listed in Table 2.

Embodiments 7-9

Except for passing a primary purified sulfuryl fluoride gas through a sodium bisulfite solution, a sodium pyrosulfite solution, and a sodium thiosulfate solution with a concentration of 5 wt. %, respectively, for purification, the others are the same as embodiment 1, where results are listed in Table 2.

Embodiment 10

Place 175.3 g solid barium fluoride in a reactive kettle; heat the apparatus to 580° C. by an electric heater; pass sulfur trioxide steam through solid barium fluoride at 10 ml/min, where a molar ratio of barium fluoride to sulfur trioxide is 1:2.5, acquire a sulfuryl fluoride mixed gas from reaction; pickle the acquired mixed gas through a concentrated sulfuric acid solution with a concentration of 70% containing in a pickling tank to acquire a primary purified sulfuryl fluoride gas; then pass the primary purified sulfuryl fluoride gas into a sodium sulfite solution with a concentration of 5 wt. % for purification; cool the acquired sulfuryl fluoride gas with liquid nitrogen and then pass the sulfuryl fluoride gas into a rectification tower for rectification and separation, control the rectification temperature to −70° C. and a reflux ratio to 0.5; and dry the acquired sulfuryl fluoride gas.

Detect the acquired sulfuryl fluoride gas by gas chromatography, where purity of the acquired sulfuryl fluoride is listed in Table 2.

Embodiments 11-14

Except for rectifying and separating a sulfuryl fluoride gas treated with sodium sulfite with a rectification temperature of −65° C. and a reflux ratio of 0.6, a rectification temperature of −60° C. and a reflux ratio of 0.7, a rectification temperature of −55° C. and a reflux ratio of 0.8, a rectification temperature of −50° C. and a reflux ratio of 1, respectively, the others are the same as embodiment 10, where results are listed in Table 2.

Embodiments 15-21

Except for passing a primary purified sulfuryl fluoride gas into a sodium sulfite solution with a concentration of 5 wt. %, and adding potassium iodide of 0.1 wt. %, 0.3 wt. %, 0.5 wt. %, 1 wt. %, 1.5 wt. %, 2 wt. % and sodium iodide of 0.5 wt. % into the sodium sulfite solution, the others are the same as embodiment 1, where results are listed in Table 2.

Embodiment 22

Except for passing a primary purified sulfuryl fluoride gas into a sodium sulfite solution with a concentration of 5 wt. % and containing potassium iodide of 0.5 wt. %, then rectifying and separating the acquired sulfuryl fluoride gas with a rectification temperature of −70° C. and a reflux ratio of 0.5, the others are the same as embodiment 1, where results are listed in Table 2.

Embodiment 23

Except for rectifying and separating the acquired sulfuryl fluoride gas with a rectification temperature of −50° C. and a reflux ratio of 1, the others are the same as embodiment 22, where results are listed in Table 2.

TABLE 1

| Composition of mixed gas | |
|---|---|
| Composition of mixed gas | Content (%) |
| $SO_2F_2$ | 90.2 |
| $SO_3$ | 6 |
| $OF_2$ | 1.2 |
| $F_4OS$ | 1 |
| $SF_6$ | 1.5 |
| others | <0.1 |

It can be seen from results in Table 1 that in the untreated sulfuryl fluoride mixed gas, purity of sulfuryl fluoride is about 90%, and there are raw material sulfur trioxide steam, oxygen difluoride, sulfoxide tetrafluoride, sulfur hexafluoride and other by-products in the mixed gas.

TABLE 2

Parameters and results of relevant experimental procedures

| Embodiments No. | S3 Concentration | S3 Material | S4 Temperature | S4 Reflux ratio | SO₂F₂ purity (%) |
|---|---|---|---|---|---|
| Comparative example 2 | — | — | — | — | 94.5 |
| Comparative example 3 | — | — | — | — | 94.9 |
| 1 | 2 wt. % | Na₂SO₃ | — | — | 96.2 |
| 2 | 4 wt. % | Na₂SO₃ | — | — | 97.4 |
| 3 | 5 wt. % | Na₂SO₃ | — | — | 98.1 |
| 4 | 6 wt. % | Na₂SO₃ | — | — | 97.3 |
| 5 | 8 wt. % | Na₂SO₃ | — | — | 96.8 |
| 6 | 10 wt. % | Na₂SO₃ | — | — | 96.1 |
| 7 | 5 wt. % | NaHSO₃ | — | — | 97.5 |
| 8 | 5 wt. % | Na₂S₂O₅ | — | — | 97.1 |
| 9 | 5 wt. % | Na₂S₂O₃ | — | — | 96.7 |
| 10 | 5 wt. % | Na₂SO₃ | −70 | 0.5 | 98.7 |
| 11 | 5 wt. % | Na₂SO₃ | −65 | 0.6 | 98.9 |
| 12 | 5 wt. % | Na₂SO₃ | −60 | 0.7 | 99.8 |
| 13 | 5 wt. % | Na₂SO₃ | −55 | 0.8 | 99.1 |
| 14 | 5 wt. % | Na₂SO₃ | −50 | 1 | 98.8 |
| 15 | 5 wt. % + 0.1 wt. % | Na₂SO₃ + KI | — | — | 98.3 |
| 16 | 5 wt. % + 0.3 wt. % | Na₂SO₃ + KI | — | — | 98.4 |
| 17 | 5 wt. % + 0.5 wt. % | Na₂SO₃ + KI | — | — | 98.5 |
| 18 | 5 wt. % + 1 wt. % | Na₂SO₃ + KI | — | — | 98.3 |
| 19 | 5 wt. % + 1.5 wt. % | Na₂SO₃ + KI | — | — | 98.4 |
| 20 | 5 wt. % + 2 wt. % | Na₂SO₃ + KI | — | — | 98.3 |
| 21 | 5 wt. % + 0.5 wt. % | Na₂SO₃ + NaI | — | — | 98.3 |
| 22 | 5 wt. % + 0.5 wt. % | Na₂SO₃ + KI | −70 | 0.5 | 99.1 |
| 23 | 5 wt. % + 0.5 wt. % | Na₂SO₃ + KI | −50 | 1 | 99.3 |

It can be seen from results in Table 2 that the purity of sulfuryl fluoride after being pickled with the concentrated sulfuric acid is only 94.5%, the purity of sulfuryl fluoride after further purification with a sodium sulfite solution is about 98%, and the purity of sulfuryl fluoride after rectification and separation is up to about 99%. It can be seen that the method of the present application can acquire the sulfuryl fluoride gas of high purity.

It is noted that the present application is not limited to the foregoing embodiments. The above embodiments are merely examples, and embodiments having substantially the same configuration as the technical idea and exerting the same effects within the scopes of the technical solutions of the present application are all included in the technical scope of the present application. In addition, various modifications may be made to the embodiments by those skilled in the art without departing from the spirit and scope of the present application, and other embodiments that are constructed by combining some of the constituent elements of the embodiments are also included in the scope of the present application.

What is claimed is:

1. A method of preparing sulfuryl fluoride, comprising the following steps of:
    S1) reacting sulfur trioxide steam with barium fluoride to acquire a mixed gas of barium sulphate and sulfuryl fluoride;
    S2) pickling the mixed gas acquired in step S1 with a concentrated sulfuric acid solution with a concentration of 70-98.3 wt. % to acquire a primary purified sulfuryl fluoride gas; and
    S3) passing the primary purified sulfuryl fluoride gas acquired in step S2 through an aqueous solution with a concentration of 2-10 wt. % of a compound selected from at least one of the following: sodium sulfite, sodium bisulfite, sodium pyrosulfite, or sodium thiosulfate, to acquire a sulfuryl fluoride gas,
    wherein in the sulfuryl fluoride gas acquired in step S3, a volume fraction of oxygen difluoride is less than 0.1%.

2. The method according to claim 1, wherein the method further comprises step S4 of cooling the sulfuryl fluoride gas acquired in step S3 with liquid nitrogen and then passing the sulfuryl fluoride gas into a rectification system for rectification and separation, a temperature of the rectification is −70 to −50° C., and a reflux ratio is 0.5-1.

3. The method according to claim 1, wherein potassium iodide or sodium iodide with a concentration of 0.1-2 wt. % is added to the aqueous solution in step S3.

4. The method according to claim 1, wherein in step S3, the primary purified sulfuryl fluoride gas acquired in step S2 is passed through a sodium sulfite aqueous solution of 2-10 wt. %.

5. The method according to claim 4, wherein potassium iodide of 0.1-2 wt. % is added to the sodium sulfite aqueous solution of 2-10 wt. % in step S3.

6. The method according to claim 1, wherein in step S3, a primary purified sulfuryl fluoride gas bubble passes through the aqueous solution of the compound selected from at least one of sodium sulfite, sodium bisulfite, sodium pyrosulfite or sodium thiosulfate, the aqueous solution having a temperature of 20-40° C.

7. The method according to claim 1, wherein in the sulfuryl fluoride gas acquired in step S3, a volume fraction of sulfoxide tetrafluoride is less than 0.15%.

8. The method according to claim 1, wherein the barium fluoride in step S1 is prepared by treating a barium sulfide aqueous solution with hydrogen fluoride, or by reacting barium chloride with sodium fluoride.

9. The method according to claim 1, wherein in step S1, the sulfur trioxide steam is directly used or the sulfur trioxide steam transported through helium as a carrier is used to react with the barium fluoride.

10. The method according to claim 1, wherein in step S1, a molar ratio of the sulfur trioxide steam to the barium fluoride is 2:1-5:1, and a reaction temperature is 500-600° C.

11. The method according to claim 1, wherein the barium sulphate acquired in step S1 is reduced with carbon at a temperature of 600-1200° C. to acquire barium sulfide.

12. The method according to claim 1, wherein the acquired sulfuryl fluoride gas is dried, compressed and condensed to acquire a sulfuryl fluoride product.

13. A method of preparing sulfuryl fluoride, comprising the following steps of:
S1) reacting sulfur trioxide steam with barium fluoride to acquire a mixed gas of barium sulphate and sulfuryl fluoride;
S2) pickling the mixed gas acquired in step S1 with a concentrated sulfuric acid solution with a concentration of 70-98.3 wt. % to acquire a primary purified sulfuryl fluoride gas; and
S3) passing the primary purified sulfuryl fluoride gas acquired in step S2 through an aqueous solution with a concentration of 2-10 wt. % of a compound selected from at least one of the following: sodium sulfite, sodium bisulfite, sodium pyrosulfite, or sodium thiosulfate, to acquire a sulfuryl fluoride gas,
wherein in the sulfuryl fluoride gas acquired in step S3, a volume fraction of sulfoxide tetrafluoride is less than 0.15%.

14. The method according to claim 13, wherein the method further comprises step S4 of cooling the sulfuryl fluoride gas acquired in step S3 with liquid nitrogen and then passing the sulfuryl fluoride gas into a rectification system for rectification and separation, a temperature of the rectification is −70 to −50° C., and a reflux ratio is 0.5-1.

15. The method according to claim 13, wherein potassium iodide or sodium iodide with a concentration of 0.1-2 wt. % is added to the aqueous solution in step S3.

16. The method according to claim 13, wherein in step S3, the primary purified sulfuryl fluoride gas acquired in step S2 is passed through a sodium sulfite aqueous solution of 2-10 wt. %.

17. The method according to claim 16, wherein potassium iodide of 0.1-2 wt. % is added to the sodium sulfite aqueous solution of 2-10 wt. % in step S3.

18. The method according to claim 13, wherein in step S3, a primary purified sulfuryl fluoride gas bubble passes through the aqueous solution of the compound selected from at least one of sodium sulfite, sodium bisulfite, sodium pyrosulfite or sodium thiosulfate, the aqueous solution having a temperature of 20-40° C.

19. The method according to claim 13, wherein the barium fluoride in step S1 is prepared by treating a barium sulfide aqueous solution with hydrogen fluoride, or by reacting barium chloride with sodium fluoride.

20. The method according to claim 13, wherein in step S1, the sulfur trioxide steam is directly used or the sulfur trioxide steam transported through helium as a carrier is used to react with the barium fluoride.

* * * * *